United States Patent [19]
Borsa et al.

[11] 3,839,685
[45] Oct. 1, 1974

[54] SINGLE-STAGE BALANCED OSCILLATOR/FREQUENCY MULTIPLIER

[75] Inventors: Andrew J. Borsa, Pelham, N.H.; Bruce O. Cox, Walpole, Mass.

[73] Assignee: Bell & Howell Company, Chicago, Ill.

[22] Filed: Mar. 1, 1973

[21] Appl. No.: 337,145

[52] U.S. Cl. ................ 331/114, 331/77, 331/116 R
[51] Int. Cl. ............................................ H03b 5/36
[58] Field of Search........ 331/100, 102, 114, 116 R, 331/159, 77, 168

[56] References Cited

UNITED STATES PATENTS 3,299,371 1/1967 Ryan .................................. 331/114

*Primary Examiner*—Herman Karl Saalbach
*Assistant Examiner*—Siegfried H. Grimm
*Attorney, Agent, or Firm*—Alfred H. Rosen; Frank A. Steinhilper

[57] ABSTRACT

A push-pull oscillator circuit is frequency-stabilized with a resonant component in a common unbalanced portion of the feedback loops which receives from at least one shunt branch of the circuit an unbalanced electrical wave at the fundamental frequency, to furnish a balanced push-pull wave at the same frequency as drive to the respective branches. With the oscillator stabilized for operation around Class B (or from AB to C) an output circuit in the push-pull mode generates an even harmonic that is substantially free of fundamental content.

11 Claims, 2 Drawing Figures

PATENTED OCT 1 1974 3,839,685

SINGLE-STAGE BALANCED OSCILLATOR/FREQUENCY MULTIPLIER

BACKGROUND OF THE INVENTION

Designers of self-powered radio communications equipment, especially of the ultra-miniature pocket-portable type using small and light-weight sources of electric energy, have need for electronic frequency generators and multipliers which will consume minimum electric current while providing stable-frequency with electric wave energy which is "clean," that is, without significant energy in neighboring frequency ranges, such as harmonically related frequencies. This invention is addressed to that problem, as exemplified in the design and construction of battery-powered pocket-portable paging receivers.

If two class C amplifiers are driven in push-pull, each has a train of current pulses which are identical except that they differ in phase by one-half cycle of the input wave. Such arrangements using vacuum tubes are shown in FIG. 15.5 on page 554 of Volume 19, Radiation Laboratory Series (McGraw-Hill 1949). The discussion at page 553 points out that if the two plates are connected in parallel to drive a single load impedance as in FIG. 15.5(*a*) (sometimes called a "push-push" connection) the output contains only the even harmonics of the input wave. If the difference of the two currents is applied to the load impedance in the push-pull plate connection of FIG. 15.5(*b*) the output contains only the odd harmonics of the input wave. Of course, if the circuit is not exactly balanced this separation of harmonics is not complete.

While this method is recommended for generating good sine waves at high harmonics using amplifiers, the text recognizes difficulties in translating the technique to use with synchronized oscillators to produce a sinusoidal output. It is known to obtain local oscillator frequencies at UHF and VHF by multiplying a lower-frequency generated in an available stable oscillator, such as a crystal-controlled oscillator, or an LC oscillator. Generally it has been preferred to use separate stages for frequency generation and multiplication, in order to enhance the production of a stable-frequency and clean output. Separate stages normally use an oscillator biased class A and an active or passive multiplier biased class B or class C. The product of the oscillator and multiplier efficiencies gives the total efficiency. A class A oscillator can lower the total efficiency rather drastically.

Single-stage oscillator-multiplier combinations are known which can produce higher total efficiency than separate stages but the output frequency stability and cleanliness are relatively poorer. Spurious frequencies abound when non-linear multipliers are used, and the output requires large amounts of filtering for low content of undesired harmonics. A somewhat similar difficulty arises in push-pull arrangements, such as tuned-grid-tuned-plate systems that have often been used in VHF oscillators. While these arrangements have the advantage that they are symmetrical with respect to ground, they require two separate feedback loops, and this introduces the very real possibility that the circuit will not be exactly balanced, so that the desired separation of harmonics may not be complete. Again, as a consequence, the output requires large amounts of filtering for low content of undesired harmonics. Thus, clean and stable oscillator-multiplier combinations have also suffered from low efficiency.

BRIEF DESCRIPTION OF THE INVENTION

The present invention is based upon a push-pull oscillator circuit which can be frequency-stabilized with a single stabilizing means. The circuit generally comprises two shunt branches having respective feedback loops sharing a common portion, the loops having the property of resonance to the fundamental frequency of the circuit, and the common portion is arranged to receive from at least one of the shunt branches of the circuit an unbalanced electric wave at the fundamental frequency. The circuit includes means to derive from the loops an essentially sinusoidal balanced push-pull electric wave at the fundamental frequency and to supply that wave as drive to the respective shunt branches. A component, such as a crystal, which is resonant to the fundamental frequency, can be located in the common portion to provide frequency-stabilization. The oscillator can provide output at an even or an odd harmonic frequency, depending on the output circuit configuration. A push-push output circuit configuration with appropriate filtering will provide even harmonics while a push-pull output configuration will provide odd harmonics again with appropriate filtering. The output circuitry and following filters operate essentially independently from the oscillator circuit itself, the oscillator circuit being substantially balanced and therefore singularly free of spurious frequency components. In fact, in the even-harmonic output circuit configuration (push-push) the oscillator may be operated substantially in the class C mode and does not draw fundamental current, which makes the total oscillator-multiplier combination uniquely adaptable as a low current-drain circuit combination, and which contributes also to the purity of the output harmonic frequency in that the fundamental frequency is naturally rejected. Some such circuit combinations according to the invention have been built in which the fundamental frequency signal found in the second-harmonic output circuit is 20 db down from the desired second-harmonic signal with no tuned circuit in the output, and 40 db down with a tuned circuit (tuned to the second harmonic frequency). This combination lends itself to use in hybrid microcircuit construction, employing for example an integrated transistor array, and is to be preferred for use in ultra-miniature communications equipment. The invention is therefore illustrated as applied to even-harmonic frequency generators, although it will be understood that the push-pull oscillator circuit itself may be combined with other output configurations, for other uses.

BRIEF DESCRIPTION OF THE DRAWINGS

FIG. 1 shows circuitry for a combined overtone crystal oscillator – even harmonic multiplier. Transistors Q1 and Q2 function as the oscillating and multiplying active elements, each having a feedback loop between its emitter (*e*) and its base (*b*). Q1 and Q2 emitters (*e*) drive a first balun transformer T1, imposing on its primary winding $T1_{(P)}$ a balanced sinusoidal waveform which is the net effect of the push-pull waves appearing, respectively, at Q1 and Q2 emitters (*e*). This waveform is converted in the secondary winding T1(s) into an unbalanced linear sinewave, which drives a crystal Y, in a series mode in a common unbalanced portion of the feedback loops including the primary winding (P') of a second balun transformer T2, with the junction 10 of T1(*s*) and T2(*p*') grounded. The crystal drives the second balun T2 to provide balanced push-pull drive to Q1 and Q2 bases (*b*). Details of this circuit are as follows.

Figure 1:
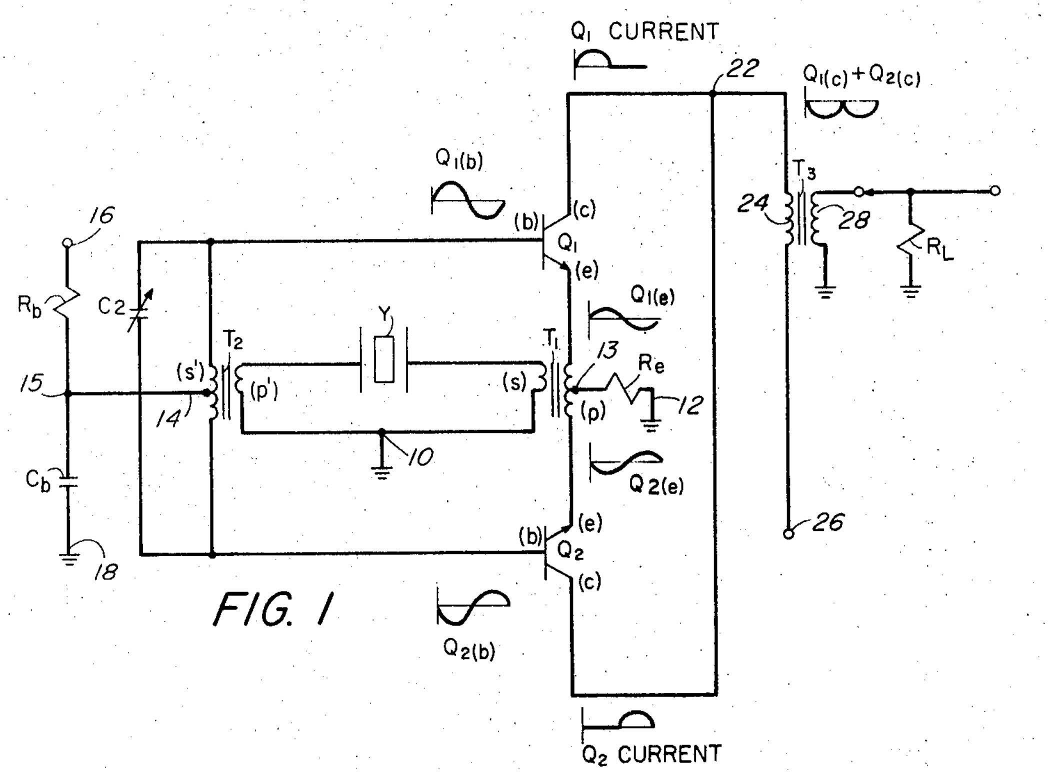
FIG. 1 is a circuit diagram of a first embodiment of the invention.

The primary winding T1(*p*) of the first balun transformer is connected between the emitters (*e*) of the two transistors Q1 and Q2. This primary also provides a DC ground for the emitters via a tap 12 to ground. The secondary winding T2(*s*') of the second balun transformer is connected between the bases (*b*) of the two transistors. A tap 14 on this secondary is connected to the junction 15 of a base resistor R*b* and capacitor C*b*, which are connected in series between a tap 16 to a source of driving voltage (e.g.: 1.2 volts) and ground at 18. The resistor Rb sets the non-oscillating collector currents for the transistor Q1 and Q2. The capacitor Cb provides *r-f* decoupling and aids oscillator starting by initially biasing Q1 and Q2 in a class A mode. After starting, operation stabilizes in class AB, B or C, depending on the exact configuration of the bias circuit and its parameters.

A variable capacitor C2 is connected across T2 secondary (S'), for tuning T2, to pick out the desired crystal overtone when the crystal Y is operated in the overtone series mode as shown. As a crystal oscillator, the oscillator circuit may use either fundamental or overtone series mode crystals in the feedback loop. An overtone crystal requires tuning T2 to select the proper overtone frequency. A fundamental crystal will work well with only a broad band (untuned) second (output) balun transformer T2. For an LC oscillator, the crystal Y may be removed and then the second balun T2, with secondary tuning, would act as a common frequency selective portion in the feedback loops. Conversely, the crystal Y may be replaced with a series-tuned LC network, as a fundamental frequency resonant component, and then T2 may be used in the broadband (untuned) condition.

The ground tap 12, for the primary winding T1(*p*) of the input balun transformer to the common portion of the feedback loops, is preferably coupled to a center point 13 of the primary winding (*p*). Inclusion of a common emitter resistor Re in this ground connection will permit adjusting of emitter current and coincident DC feedback to further linearize and balance the source impedance for the input balun T1. The words "balanced" and "unbalanced" as used herein have meanings that are well-recognized in this art. A balanced sine wave has another wave which instantaneously is equal and opposite to it with respect to ground — as the voltage wave at Q1(*e*) is instantaneously equal and opposite throughout its cycle to the voltage wave Q2(*e*). An unbalanced wave lacks another such balancing wave, and that is what occurs at T1(*s*) relative to the ground junction 10.

In a typical arrangement providing class AB circuit operation the following component values have been used in the oscillator section:

| | | |
|---|---|---|
| +Vcc | = | 1.2 volts |
| R*b* | = | 33K |
| C*b* | = | 1000 pf |
| C2 | = | 3–10 pf |
| Q1,Q2 | = | KT-5003 (each) |

Different bias conditions can provide other operating modes, as is noted above.

The collector circuit uses a push-push configuration. The collectors Q1(*c*) and Q2(*c*) are connected to a common junction 22, which is connected via the primary winding 24 of an output transformer T3 to a terminal 26 for operating voltage. The secondary winding 28 of the output transformer is connected into a 50 Ω load $R_L$. The output circuit has no tuned circuit in it. Tuning can be provided, if desired, for enhancing output signal purity.

In an experimental circuit made according to FIG. 1, transistors Q1 and Q2 were chosen for a reasonable match and all other components were ± 10 percent. The following summary gives a profile of typical results obtained:

| | | |
|---|---|---|
| Power Input D.C. | = | 1.2V at 1mA |
| | = | 1.2 mW |
| Power Output R.F. | = | 160 mV into 50 Ω |
| | = | 0.5 mW |
| Efficiency – (R.F. out/D.C. in) | = | 42% |
| Crystal Frequency | = | 70 MHz |
| Output Frequency | = | 140 MHz |
| Odd Harmonic Rejection: | | |
| 1st | = | 20 db |
| 3rd | = | 30 db |

Figure 2:
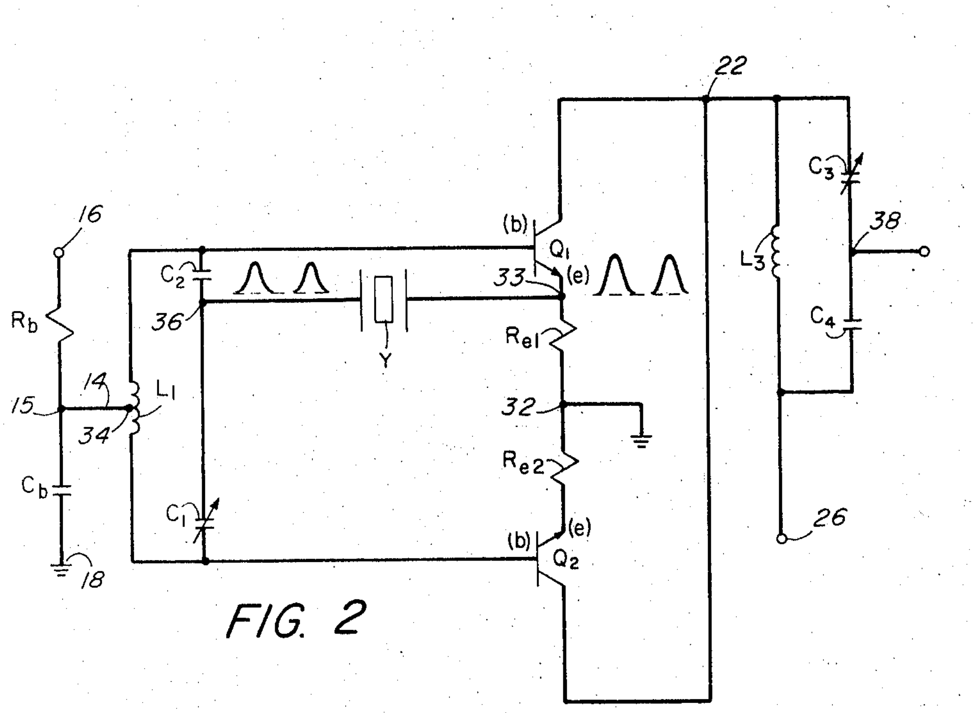
FIG. 2 is a circuit diagram of a second embodiment of the invention.

FIG. 2 shows a combined oscillator/multiplier which is the capacitive analogue of FIG. 1. Transistors Q1 and Q2, crystal Y, and input bias control components Rb and Cb are similar to the like-referenced components in FIG. 1. In this circuit, the bias control components Rb and Cb initially provide class A bias for starting, and stabilize operation around class B for sustained oscillation.

Q1 and Q2 emitters (*e*) are connected together by two resistors Re1 and Re2, the junction 32 of which is grounded. The crystal Y is connected at one side to the junction 33 of Q1 emitter and the first resistor Re1. Two capacitors C1 (variable) and C2 are connected in series between Q1 and Q2 bases (*b*), and an inductor L1 is connected across them, with an intermediate tap 34 on the inductor connected to the bias tap 14. The second side of the crystal Y is connected to the junction 36 between the capacitors C1 and C2. The crystal "sees" only the voltage wave W4 that appears at Q1 emitter, which will be a partial sine-wave during class B oscillation.

The circuit of FIG. 2 operates by utilizing an unbalanced base-emitter feedback loop — Q1(*b*) - C2 - 36 - Y - 33 - Q1 (*e*) — to control both halves of a push-pull oscillator. Q1 emitter drives the crystal Y with an unbalanced linear sine wave W4 to feed an unbalanced capacitive divider C1/C2. The inductor L1 and the two capacitors C1 and C2 are tuned to the desired crystal overtone and, with sufficient Q, this tuned circuit converts unbalanced crystal drive to balanced drive on alternate half-cycles to Q1 and Q2 bases. The inductor resonates with the series combination of the capacitors C1 and C2, and the ratio of C2 to C1 determines the loop gain and emitter to base impedance matching necessary for oscillation. For stable oscillation to occur, it is essential for C1 and C2 to be unequal. Varying the resistance of the first resistor Re1 [at Q1 (e)] allows adjustment of crystal source impedance and feedback, while both Re1 and Re2 serve to linearize and balance emitter impedances for improved undesired harmonic rejection. Increasing the magnitudes of Re1 and Re2 will improve stability and balance at the expense of r.f. voltage output and efficiency.

The output circuit of FIG. 2, like that of FIG. 1 operates in the push-push mode. However, opportunity has been taken in FIG. 2 to illustrate a second harmonic output circuit including a network L3 – C3 – C4 that is tunable to the desired even harmonic frequency. The common collector junction 22 is connected to one side of the tuned circuit, while the voltage supply terminal 26 is connected to the other. Harmonic output is taken from the junction 38 of the two capacitors C3 and C4.

We claim:

1. A push-pull oscillator circuit comprising two shunt branches having respective feedback loops sharing a common portion, said loops having the property of resonance to the fundamental frequency of said circuit, said circuit having frequency-stabilizing means in said common portion, means to apply to said common portion from at least one of said branches an unbalanced electric wave at said fundamental frequency, said circuit having a transistor in each branch, first impedance means connected between the emitters of said transistors, second impedance means connected between the bases of said transistors, said frequency stabilizing means being connected between said first and said second impedance means for receiving said unbalanced electric wave from said first impedance means, means to derive from said loops a balanced push-pull substantially sinusoidal wave at said fundamental frequency, and means to supply said push-pull wave as drive to said respective shunt branches of said oscillator circuit.

2. A circuit according to claim 1 in which said frequency-stabilizing means is a crystal.

3. A circuit according to claim 1 in which said first impedance means includes a first balun transformer which has its primary winding connected between said emitters, said second impedance means includes a second balun transformer which has its secondary winding connected between said bases, and said frequency stabilizing means is connected in a series loop with the secondary winding of said first balun transformer and the primary winding of said second balun transformer.

4. A circuit according to claim 1 in which said first impedance means is substantially resistive, said second impedance means is substantially capacitive, and said frequency-stabilizing means is connected from a point of unequal division in said first impedance means to a point of unequal division in said second impedance means.

5. A circuit according to claim 1 in which an intermediate point of said first impedance means is connected to a DC ground.

6. A circuit according to claim 3 in which a junction of said secondary winding of said first balun transformer and said primary winding of said second balun transformer is connected to DC ground.

7. A circuit according to claim 1 including bias means having resistance and capacitance arranged to be in series across a source of driving voltage, a connection from the junction of said resistance and capacitance to an intermediate tap on said second impedance means, and load impedance means coupled to said oscillator circuit, said bias means being dimensionsed to bias said oscillator circuit in a substantially class A mode for the non-oscillating state and in a mode selected from among AB, B and C for the oscillating condition.

8. An electric circuit for generating from the energy content of an electric wave having a given fundamental frequency an electric wave having a second frequency which is an even harmonic of said fundamental frequency, comprising: a push-pull oscillator circuit for generating said fundamental frequency wave, said oscillator circuit being comprised of two shunt branches having respective feedback loops sharing a common portion through which to supply to said loops an unbalanced feedback signal from at least one of said branches, means to bias said oscillator circuit for stable operation in the range from class AB to class C, and coupled to said oscillator circuit a push-push output circuit for said harmonic frequency wave.

9. An electric circuit according to claim 8 including further means to establish starting bias for said oscillator circuit in a class A mode.

10. An electric circuit for generating from the energy content of an electric wave having a given fundamental frequency an electric wave having a second frequency which is an even harmonic of said fundamental frequency, comprising: a push-pull oscillator circuit for generating said fundamental frequency wave, and coupled to said oscillator circuit a push-push output circuit for said harmonic frequency wave, said oscillator circuit comprised of two shunt branches each including a first or a second electric current valving device having first and second electrodes for access to a principal current path through the device and a third electrode for controlling the flow of current through that path, said respective first electrodes being coupled in parallel to said output circuit, an unbalanced feedback loop including a component tuned to said fundamental frequency coupled from said respective second electrodes in parallel to said respective third electrodes in parallel, means to apply to said component from at least one of said second electrodes an unbalanced electric wave at said fundamental frequency, means to derive from said component a balanced push-pull substantially sinusoidal wave at said fundamental frequency, means to supply said push-pull wave as drive to said respective third electrodes, and means to bias said oscillator circuit for stable oscillation in the range from Class AB to Class C.

11. An electric circuit for generating from the energy content of an electric wave having a given fundamental frequency an electric wave having a second frequency which is an even harmonic of said fundamental frequency, comprising: A push-pull oscillator circuit for generating said fundamental frequency wave, and coupled to said oscillator circuit a push-push output circuit for said harmonic frequency wave, said oscillator circuit comprised of two shunt branches each including a first or a second transistor having collector, emitter and base electrodes, said respective collector electrodes being connected together to a point to which said output circuit is coupled, an unbalanced feedback loop including a component tuned to said fundamental frequency coupled from said emitter electrodes in parallel to said base electrodes in parallel, means to apply to said component from at least one of said emitter electrodes an unbalanced electric wave at said fundamental frequency, means to derive from said component a balanced push-pull substantially sinusoidal wave at said fundamental frequency, means to supply said push-pull wave as drive to said respective base electrodes, and means to bias said oscillator circuit for stable oscillation in the range from Class AB to Class C.

* * * * *

PO-1050
(5/69)

UNITED STATES PATENT OFFICE
CERTIFICATE OF CORRECTION

Patent No. 3,839,685 Dated Oct. 1, 1974

Inventor(s) A.J. Borsa; B.O. Cox.

It is certified that error appears in the above-identified patent and that said Letters Patent are hereby corrected as shown below:

Column 3, line 22, delete "transistor" and insert --transistors--

Column 6, line 2, delete "dimensionsed" and insert --dimensioned-

In The Abstract, line 5, delete "electrical" and insert --electric-- line 9, delete "push-pull" and insert --push-push--

Signed and sealed this 10th day of June 1975.

(SEAL)
Attest:

RUTH C. MASON
Attesting Officer

C. MARSHALL DANN
Commissioner of Patents
and Trademarks